(12) United States Patent
Peterson et al.

(10) Patent No.: US 8,335,519 B2
(45) Date of Patent: Dec. 18, 2012

(54) SYSTEM AND METHOD FOR PROVIDING A COMMUNITY OF MOBILE DEVICES

(75) Inventors: Robert W Peterson, Plano, TX (US); Thomas T Wheeler, Frisco, TX (US); Deren G Ebdon, Carrollton, TX (US)

(73) Assignee: Osocad Remote Limited Liability Company, Wilmington, DE (US)

( * ) Notice: Subject to any disclaimer, the term of this patent is extended or adjusted under 35 U.S.C. 154(b) by 463 days.

(21) Appl. No.: 12/629,929

(22) Filed: Dec. 3, 2009

(65) Prior Publication Data
US 2011/0136532 A1 Jun. 9, 2011

(51) Int. Cl.
*H04W 64/00* (2009.01)
(52) U.S. Cl. ............... 455/456.1; 455/456.3; 455/414.2; 455/452.1
(58) Field of Classification Search ............... 455/456.1, 455/456.2, 456.3, 456.5, 456.6, 457, 461, 455/517, 519, 520, 67.11, 435.1, 414.2, 452.1; 340/539.13
See application file for complete search history.

(56) References Cited

U.S. PATENT DOCUMENTS

2010/0011081 A1* 1/2010 Crowley et al. ............ 455/456.3
2011/0269480 A1* 11/2011 Fong et al. ................. 455/456.1

* cited by examiner

*Primary Examiner* — John J Lee
(74) *Attorney, Agent, or Firm* — Stolowitz Ford Cowger LLP (57) ABSTRACT

In a community of mobile devices, a non-participating device can be joined to the community if the non-participating device meets location dependent criteria. The device's location can be determined, e.g. be an onboard GPS, from which it can be determined if the device is within a geospatial boundary of the community. The geospatial boundary may be calculated from the locations of community member devices. Only devices that meet the location dependent criteria will be eligible for participation in the community.

18 Claims, 9 Drawing Sheets

SYSTEM AND METHOD FOR PROVIDING A COMMUNITY OF MOBILE DEVICES

FIELD OF THE INVENTION

This disclosure relates to mobile applications and in particular to communities of mobile applications.

BACKGROUND OF THE INVENTION

Modern mobile telecommunications devices are typically capable of executing a variety of applications. In some cases, such applications may be communal applications allowing interactions among multiple devices within a community of devices. Various criteria may be established to determine whether a device is eligible to participate in a community. Community activities may require a mobile device or a user of the device to be aware of a local environment of the community. However, any device that is able to execute the community application and receive community communications will be able to participate in the community. In particular, devices in the local environment may only be effective community members while they are in the vicinity of the community, but may continue to participate when they are well outside of the community environment.

What is required is an improved system and method to dynamically determine when devices should join and leave a location-based community.

SUMMARY OF THE INVENTION

In one aspect of the disclosure, there is provided a method for joining a mobile device to a community of mobile devices. The method comprises determining a location of the mobile device, determining whether the location of the mobile device satisfies a location dependent criteria, and joining the mobile device to the community if the location of the mobile device satisfies the location dependent criteria.

In one aspect of the disclosure, there is provided a system for providing a community of mobile devices. In the system an administrator application executes on at least one community member device. The administrator application may be configured to receive a request from at least one requesting mobile device to join the community, determine a geospatial boundary of the community using locations of one or more community member mobile devices, determine whether the requesting mobile device is within the geospatial boundary, and join the requesting mobile device to the community if the requesting mobile device is within the geospatial boundary of the community.

In one aspect of the disclosure, there is provided a computer-readable medium comprising computer-executable instructions for execution by a first processor of a first mobile device, that, when executed, cause the first processor to determine a location of the first mobile device, determine whether the location of the first mobile device satisfies location dependent criteria of a community, and join the community if the location of the first mobile device satisfies the location dependent criteria.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
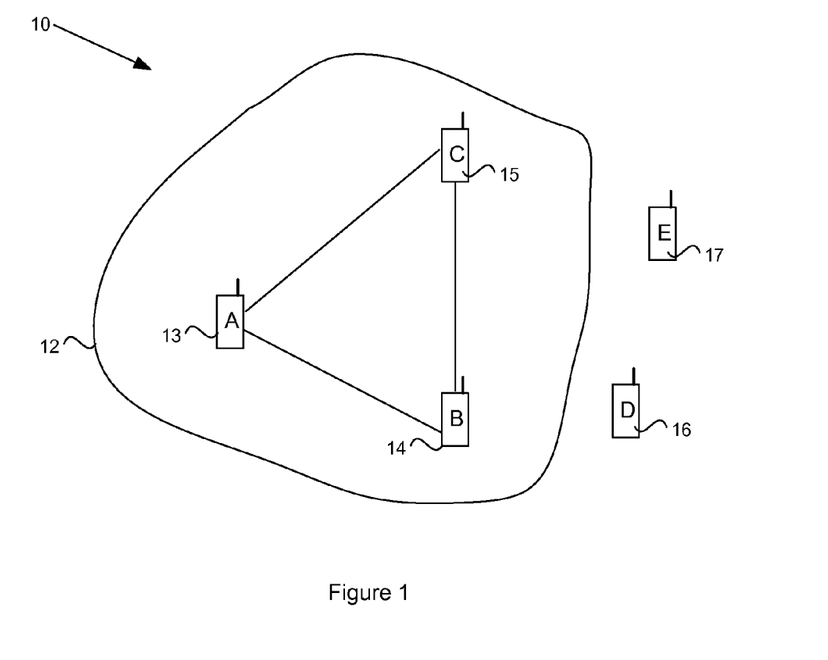
FIG. 1 illustrates a community of mobile devices.

In FIG. 1, there is shown a community 10 of devices. In the instance shown in FIG. 1, the community 10 has a boundary 12 and several devices belonging to the community within the community boundary 12. The devices belonging to the community, i.e. Device A 13, Device B 14 and Device C 15, may be fixed or mobile devices. One of the devices, say Device A 13 may be designated as an administrator and may therefore be executing an administrator role.

The dynamic community 10 may have been established as per location based rules as will be described below. In the instance shown in FIG. 1, Device D 16 and Device E 17 do not satisfy the location dependent criteria and therefore are not currently participating in the community 10.

Figure 2:
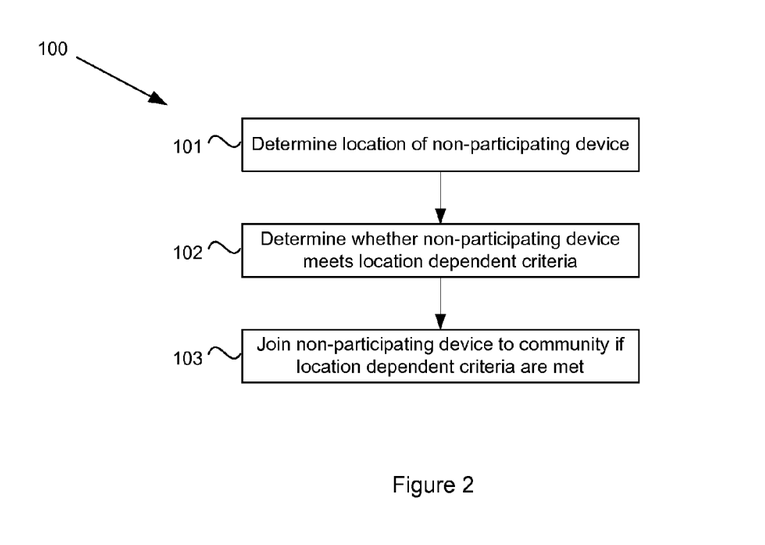
FIG. 2 illustrates a method for joining a mobile device to the community.

However, should Device D 16 or Device E 17 move, or the boundaries of the community expand, these devices may become eligible for community participation. A process 100 for joining a device, such as Device D 16 or Device E 17, to the community 10 is illustrated in FIG. 2. In the process 100, the location of the mobile device is determined (step 101) and used to determine whether the location of the mobile device satisfies the location dependent criteria (step 102). If the device's location meets the location dependent criteria, then the device may be joined to the community (step 103). The actions that join the device to the community may be undertaken by a community member device, such as administrator. Alternatively, the non-participating device may be executing sufficient code to enable the device to itself determine whether it meets the location dependent criteria of the community, and to send a join request to the community if eligible.

For the dynamic community, each of the devices are assumed to have geolocation capabilities, e.g. by onboard GPS or equivalent technology, and network communications capabilities. The dynamic location-based community may be established in several ways. In one embodiment, a device at a fixed location may create a group containing at least one permanent member. Alternatively, a mobile device may create a group containing at least one member. An individual may dynamically create a group on a mobile device at any location/time, with any lifetime. In a further alternative, a group of two or more devices may dynamically organize into a group.

Location-based criteria for creating a dynamic location-based community may include, without limitation, proximity of devices, the length of time devices have been in close proximity to each other, the number of devices in close proximity, or the proximity of devices to an identified fixed location. In addition to location based criteria, additional non-location based criteria can also be specified, such as the devices must belong to a particular network provider.

Figure 3:
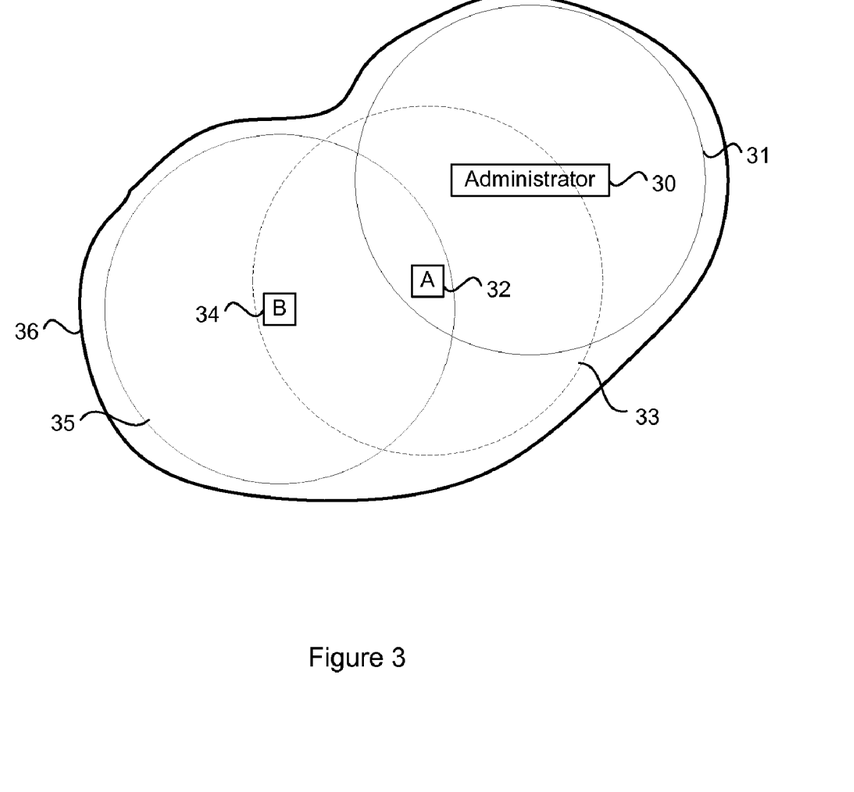
FIG. 3 illustrates a calculation of a geospatial boundary of the community.

To calculate a community boundary, a perimeter 31 may be calculated around an administrator device 30. In a simplest form, the community boundary may be considered to be only the perimeter 31. Thus the only device eligible for community participation in the instance shown in FIG. 3 is Device A 32. In an alternative calculation, higher order effects may be considered. For example, a perimeter 33 may be calculated around device A 32 and then a further perimeter 35 may be calculated around any devices within the perimeter 33, such as Device B 34. Other devices within the perimeter may be considered to be within the community's boundary. The community boundary 36 may be considered to be the boundary formed by the union of all of the perimeters 31, 33, 35. The community boundary 36 is calculated on a third order, though a person skilled in the art will recognize that the calculation may be extended to any desired number of orders. The perimeter radius may be different for each device. For example, the administrator 30 may have a first radius, second order devices such as Device A 32 may have a second radius smaller than the first radius and third order devices such as Device B 34 may have a third radius smaller than the second radius. By setting the number of orders or by establishing the perimeter radii of successive orders as increasingly smaller, there will be a maximum distance that any one device can be from the administrator (or some fixed location) in order to be considered for participation in the community. The calculation of successive orders ensures that each device is within proximity to at least one other device. In an alternative embodiment, to be considered to be within the community boundary, each device may be required to be within the perimeter union of at least two other devices, which ensures the community boundary extends only to areas with a sufficient density of devices.

Once the community is established, the devices configure network communications and determine their roles within the community. The device performing the administrator role is configured to allow or deny membership to candidate devices. If the administrator device leaves the community, another device is selected to perform the administrator role, for example by migrating the administrator role to a device within the community boundaries.

The community may be established by a variety of methods. In one embodiment, when a candidate device wishes to know about and potentially join a community, it broadcasts a device presence message containing its identity, location, and information about any community or communities it wishes to join such as interest/focus. When the administrator receives this message (either directly from the candidate device or via routing from another member or via a third-party device external to the community) it determines whether the candidate device will be allowed to know of the community's existence. If so, it sends the candidate device a community presence message containing information about the community.

Alternatively, one or more existing member devices in the community can broadcast the existence of the community to interested parties, who may then elect to request to join the community.

Figure 4:
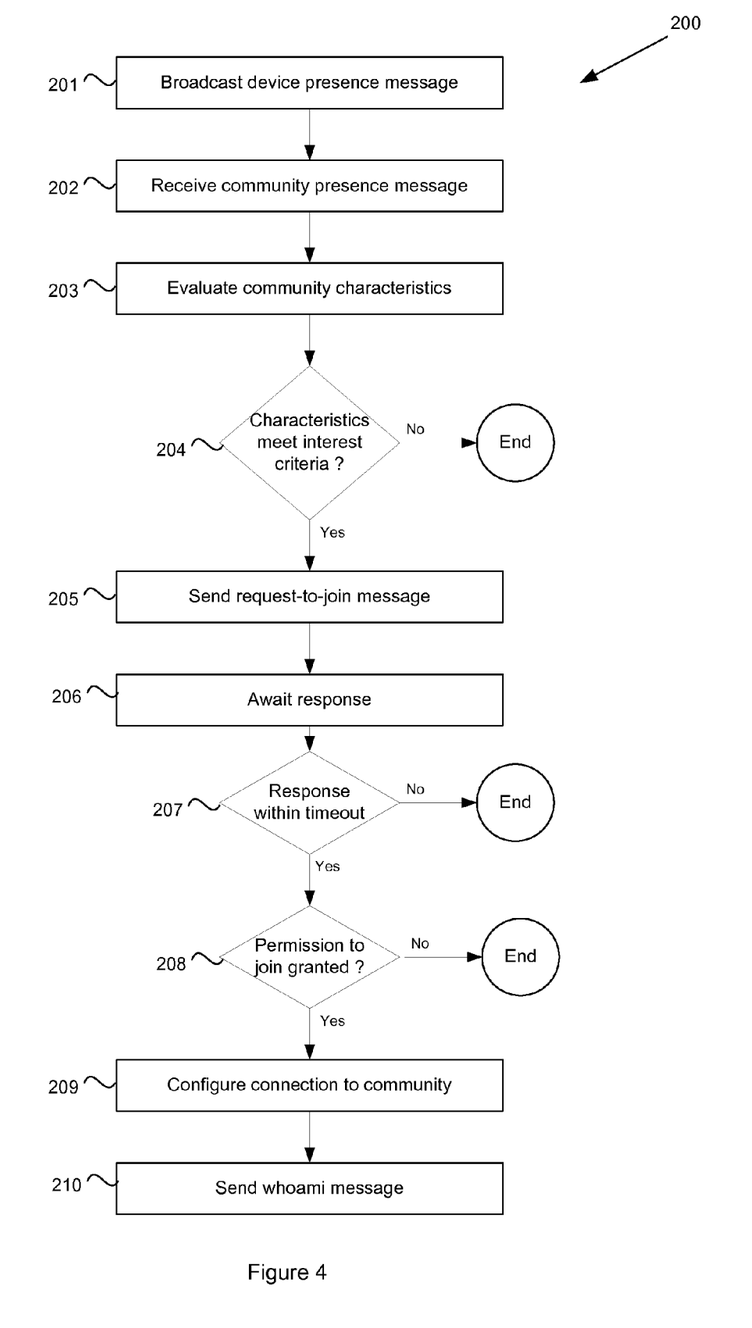
FIG. 4 illustrates a community joining process from a joining device point of view.

An example of a process for joining a mobile device to the community from the joining device's point of view is illustrated in the flowchart 200 of FIG. 4. At step 201, the device broadcasts its presence, in response to which, the device may receive a community presence message (step 202). When the candidate device receives the community presence message it evaluates the information about the community contained in the message (step 203) and decides whether the community meets criteria of communities it is interested in joining (step 204). If so, the candidate device sends a request-to-join message to the administrator 205. The evaluation of the community characteristics may be undertaken automatically by the device based on pre-programmed criteria or may require user input, such as manually accepting a community presence message and/or prompting a user to send the request-to-join message.

The request-to-join message contains the current geospatial location of the device as well as additional information necessary to grant permission to the device to join the community, such as authentication/authorization information.

Figure 5:
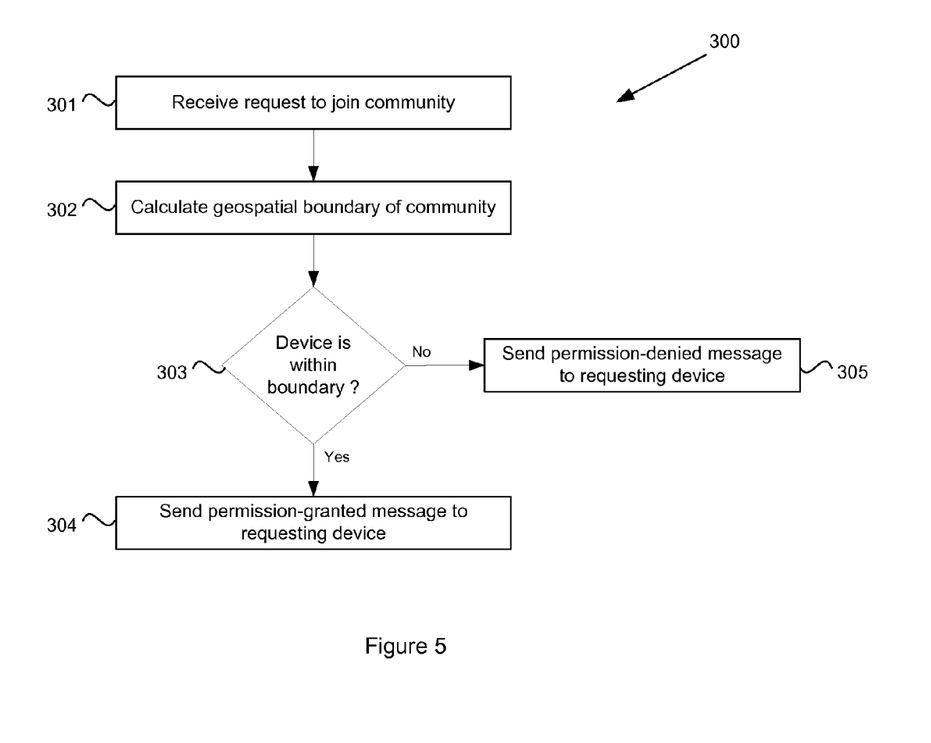
FIG. 5 illustrates the community joining process of FIG. 4 from the administrator point of view.

FIG. 5 depicts the joining process 300 from the administrator side. The administrator receives the request-to-join message 301. When the administrator receives the request-to-join message, the administrator calculates or otherwise determines the geospatial boundary of the community (step 302) and then determines whether the device will be allowed to join the community based on the information contained in the request-to-join message and the calculated geospatial boundaries of the community (step 303). If the candidate device meets the necessary criteria the administrator sends the device a membership-granted message 304; otherwise it sends a membership-denied message 305.

In one embodiment, the geospatial boundary of the community may be determined by the administrator to be the existing geospatial boundary, or a recalculated boundary dependent on existing members of the community. In an alternative embodiment, the administrator may calculate a projected boundary as if the requesting device were to be included within the community and decide on the basis of the projected community boundary whether the requesting device should be invited into the community.

With reference again to FIG. 4, the candidate device awaits a response to the request-to-join message (step 206). If no timeout 207 occurs and the candidate device receives the membership-granted message 208, it configures its network connection(s) to the community 209 and sends a whoami message 210 containing information appropriate to the community, as determined by the application. The whoami message might be provided only to the administrator, who may broadcast this message to the community, or the candidate member may directly broadcast the whoami message to the community.

Once the candidate device has joined the community, the device may participate in community tasks. The community tasks may require the device to download additional applications and tools, which may be provided from the administrator or from other community devices.

Each member device sends a location message to the administrator at a periodic interval, or when a member device has moved by a determined distance. The administrator periodically calculates the geospatial boundary of the community. When a device is approaching the boundary or is outside the boundary, the administrator sends the member a warning message indicating it will be expelled from the community. The member device may be provided a deadline by which it may move to prevent being expelled, the amount of time being determined by the application.

Alternatively, each device may be responsible for maintaining its membership in a community by evaluating at a periodic interval whether it is within the geospatial boundary of the community. For example, as shown in the process 400 of FIG. 6, a community device may periodically receive or calculate the geospatial boundary 401. If the device is within the boundary (decision step 402), then the device takes no action 403 allowing the device to continue to participate in community tasks. If the device is outside the community boundary, the device waits for a period 404, and then re-determines the geospatial boundary of the community 405. If the device is still outside of the community boundary 406, then the device leaves the community.

Figure 6:
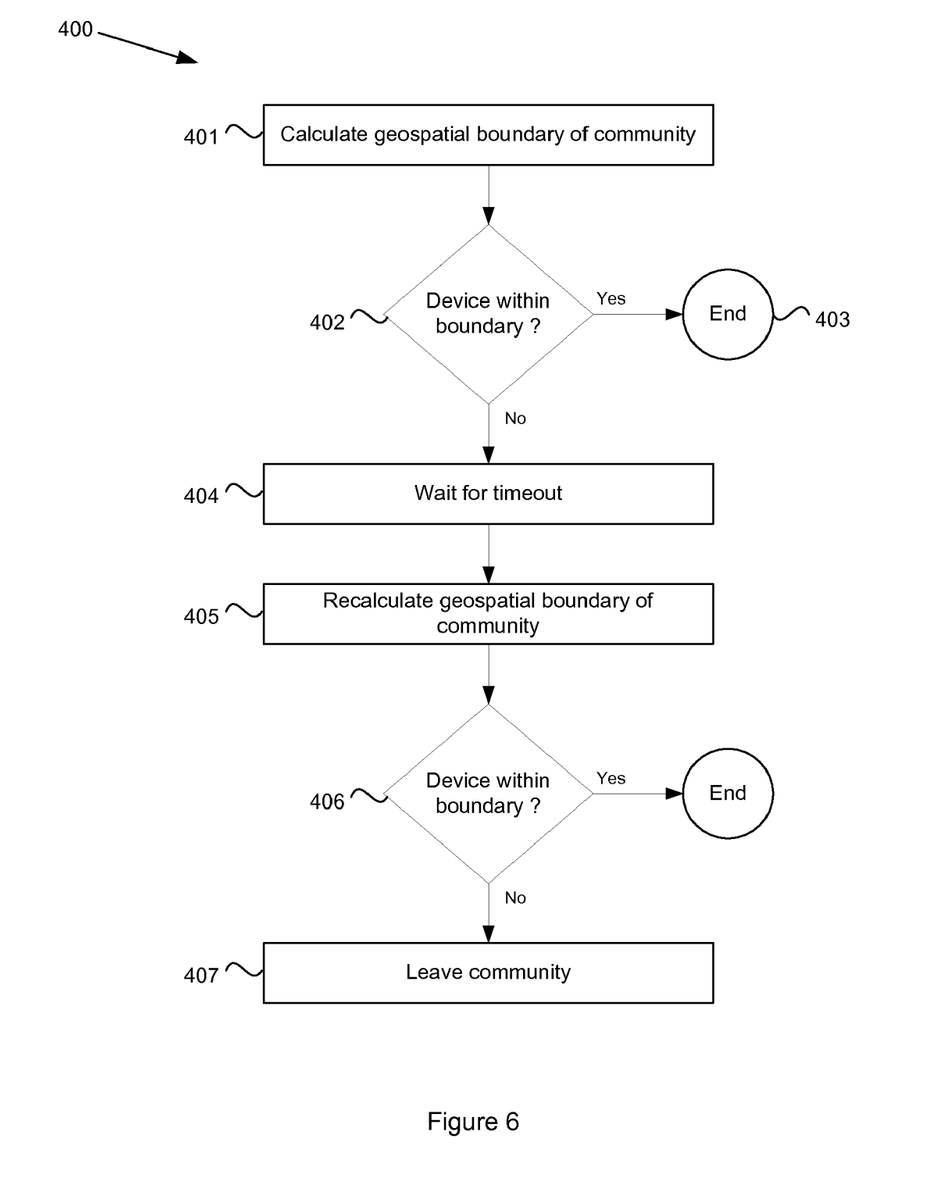
FIG. 6 illustrates process of a device leaving the community.

The timeout of step 404 may be accompanied by an optional notification to the user advising the user that the device is outside the community boundary and with optional instructions on how to return to within the community boundary. Depending on the application, a departing device may send a membership resignation message.

The location dependent criteria required to join a community may be different than the location dependent criteria required to remain in the community. For example, a device may be required to be within an inner boundary of the community in order to join, but may be allowed to remain within the community provided that the device is within an allowable extension of the community boundary.

Figure 7:
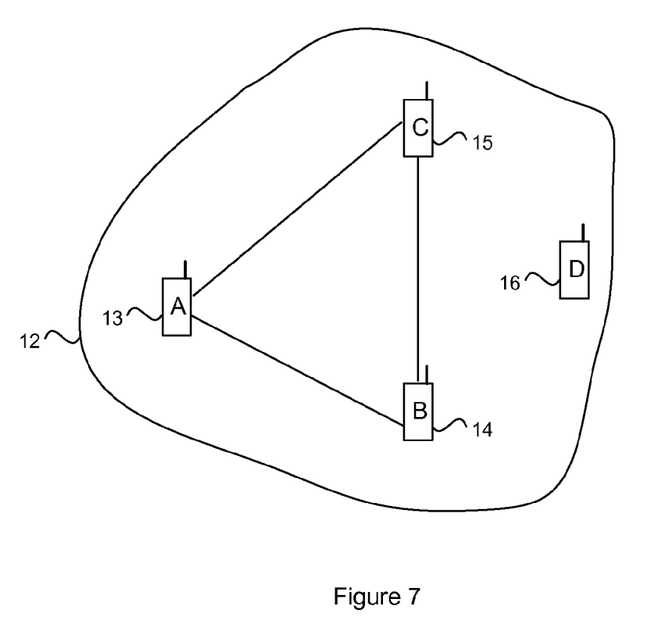
FIG. 7 illustrates a community boundary in a first instance.
Figure 8:
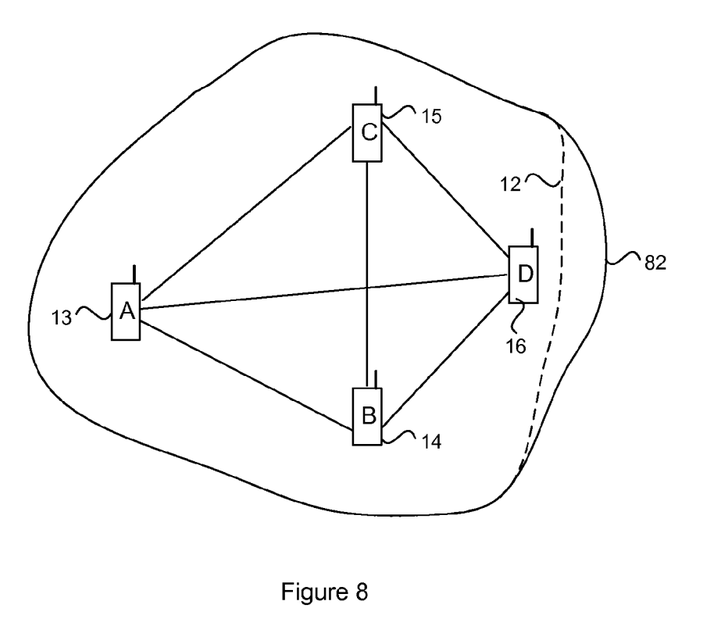
FIG. 8 illustrates a community boundary in a second instance after Device D has joined the community.

In one embodiment, the location dependent criteria are dependent on the other mobile devices within the community. For example there may be a required number or density of devices within an area in order to form a community. In one embodiment, the boundary of the community is dependent on the location of the devices themselves. For example, in one instance shown in FIG. 7, Devices A, B and C 13, 14, 15 form a community with boundary 12. In the instance shown, Device D 16 has not joined the community but is within the community boundary 12 and so is eligible to join. FIG. 8 shows an instance of the community once Device D 16 has joined. As shown, the community boundary 82, shown in solid line, has been extended by Device D 16 from its original position 12 shown in dashed line.

Figure 9:
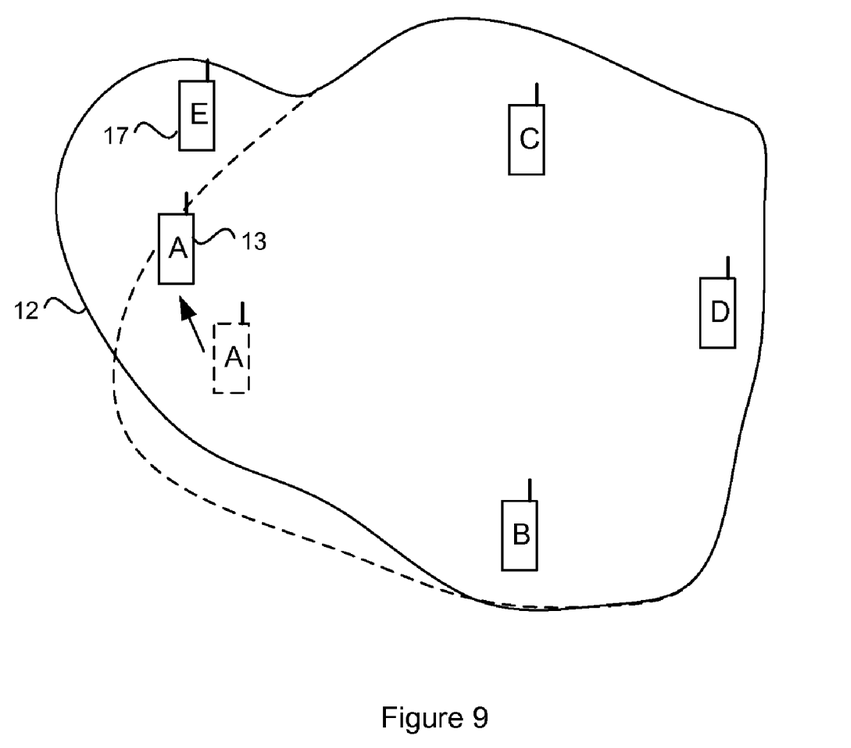
FIG. 9 illustrates the community boundary as Device A moves.

In one embodiment, the community boundary can move with the devices. For example, as shown in FIG. 9, when Device A 13 moves as indicated by the arrow from its original position (shown in dashed line) to a new position (shown in solid line), the community boundary 12 also moves and may move to the point where it encompasses previously ineligible devices, such as Device E 17. However, if Device A 13 moves too far away from the other devices of the community, then Device A may be considered to be outside of the community boundary when the community boundary is recalculated, e.g. by the administrator.

Figure 10:
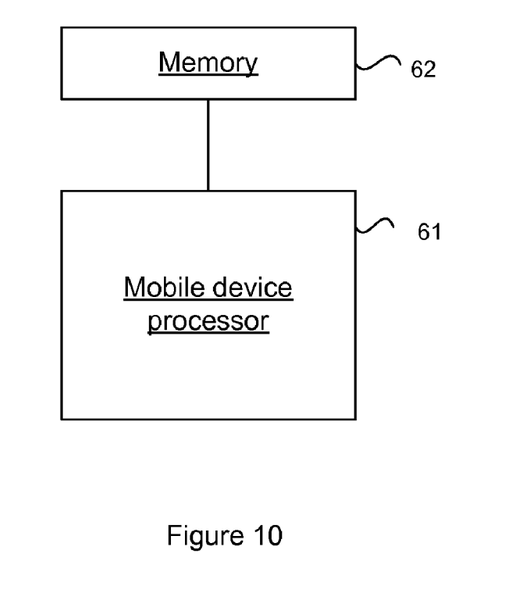
FIG. 10 illustrates a processor and memory of a mobile device that seeks to join the community.
Figure 11:
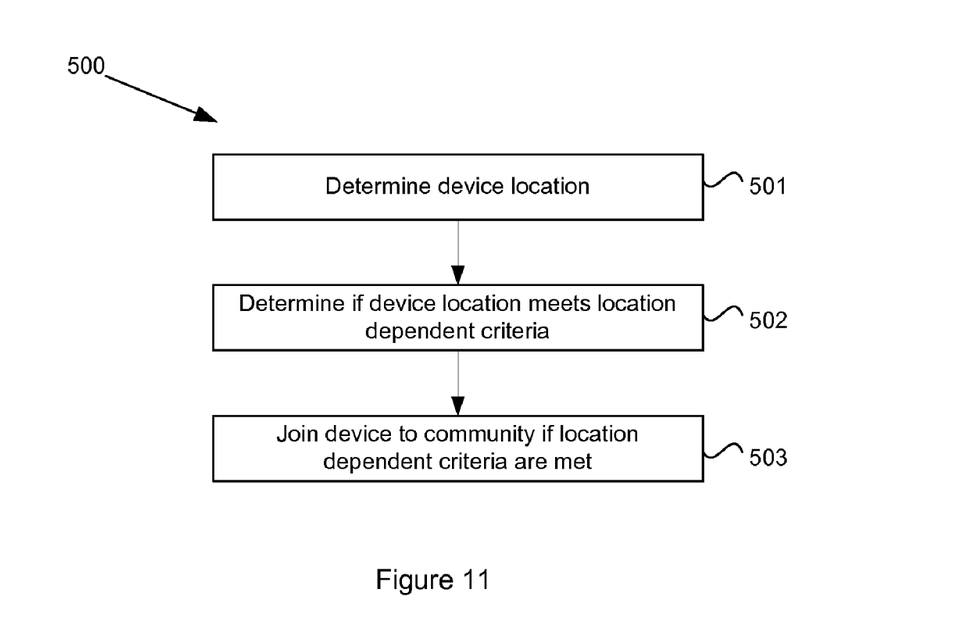
FIG. 11 illustrates an instruction set executable on the processor of FIG. 10.

The components of the community 10 may be embodied in hardware, software, firmware or a combination of hardware, software and/or firmware. In a hardware embodiment, a mobile device may include a processor 61 operatively associated with a memory 62 as shown in FIG. 10. The memory 62 may store an instruction set 500 executable by the processor 61 which may include the code for executing community applications. When executed, the instruction set 500, shown in FIG. 11, causes the processor to determine the location of the mobile device (step 501) and then to determine whether the location of the mobile device satisfies the location dependent criteria for joining the community (step 502). If the location dependent criteria are met, the processor may then proceed to join the device to the community (step 503), e.g. by sending a join request to a community administrator device.

Figure 12:
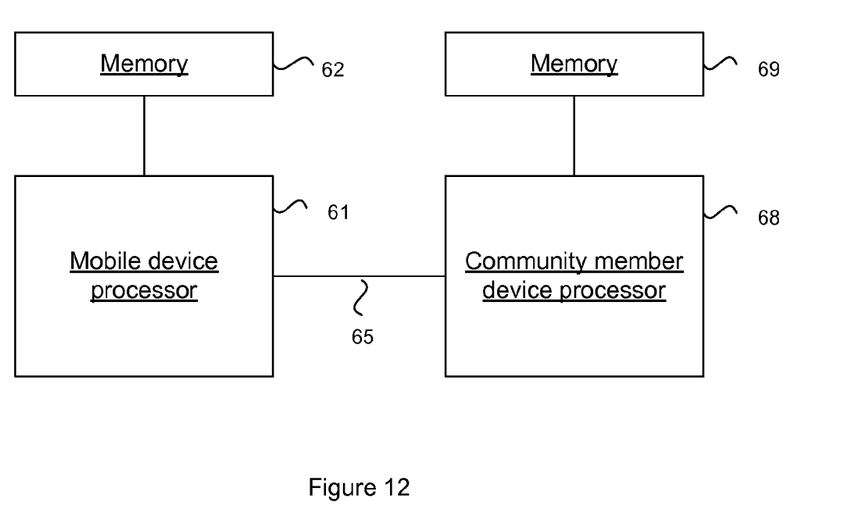
FIG. 12 illustrates the processor and memory of FIG. 10 in communication with a processor and memory of a second mobile device.

The processor 61 of the mobile device may communicate with a processor 68 and associated memory 69 of another mobile device, such as a community member device, through a suitable communications link 65, which will typically be a wireless link. Through the link 65, the processor 61 may execute various community based tasks, such as exchange of community information, as well as receiving or migrating an administrator role to or from the device.

Communication between devices in a location-based community is useful in a wide range of applications, such as an emergency/disaster response described in the Applicant's co-pending patent application Ser. No. 12/629,942, the entire contents of which are herein incorporated by reference, campus-wide messaging, etc. Thus the embodiments described above may be many applications where a group of mobile devices dynamically organize to communicate amongst themselves.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
    determining a location of at least one member mobile device in a community of member mobile devices;
    determining a geospatial boundary of the community based at least in part on determining the location of the at least one member mobile device in the community;
    determining that a mobile device is within the geospatial boundary of the community based at least in part on comparing a location of the mobile device to the geospatial boundary of the community; and
    joining the mobile device to the community of member mobile devices based at least in part on the location of the mobile device satisfying a location dependent criteria associated with the community of member mobile devices.

2. The method according to claim 1, wherein determining the geospatial boundary of the community further comprises calculating a perimeter around each of the member mobile devices in the community.

3. The method according to claim 2, wherein determining the geospatial boundary of the community further comprises calculating a sum of the perimeters around each of the member mobile devices in the community.

4. The method according to claim 1, wherein determining the geospatial boundary of the community further comprises:
    calculating a density associated with at least two member mobile devices in a predetermined geographic area; and calculating the geospatial spatial boundary based at least in part on the density associated with the at least two member mobile devices in the geographic area meeting or exceeding a threshold.

5. The method according to claim 1, wherein determining that the mobile device is within the geospatial boundary occurs further based at least in part on the location of the mobile device being within a predefined proximity of the at least one member mobile device in the community.

6. The method according to claim 1, wherein the location dependent criteria includes a criteria dependent on a location of the at least one member mobile device in the community.

7. The method according to claim 1, further comprising receiving a request to join the community from the mobile device, the request comprising the location of the mobile device.

8. A device, comprising:
a memory device configured to store executable instructions; and
a processing device configured to execute the instructions stored in the memory device to:
receive a request from a requesting mobile device to join a community comprising a plurality of member mobile devices;
determine a location of at least one member mobile device in the community; and
determine the geospatial boundary of the community based at least in part on the location of the at least one member mobile device; and
join the requesting mobile device to the community based at least in part on a location of the requesting mobile device being within the geospatial boundary of the community.

9. The device according to claim 8, wherein the processing device is further configured to:
periodically receive locations of the plurality of member mobile devices; and
determine the geospatial boundary of the community using the locations of the plurality of member mobile devices.

10. The device according to claim 9, wherein the processing device is further configured to determine that a member mobile device is located outside of the geospatial boundary.

11. The device according to claim 9, wherein the processing device is further configured to:
determine that the requesting mobile device is located outside of the geospatial boundary of the community; and
transfer execution of the instructions from the requesting mobile device to a member mobile device located within the geospatial boundary of the community.

12. The device according to claim 8, wherein the processing device is further configured to transmit a response to the requesting mobile device indicating that the requesting mobile device is joined to the community.

13. A non-transitory computer-readable storage device comprising computer-executable instructions stored thereon that configure a processing device to perform operations comprising:
determining a location of a mobile device;
determining a location of at least one member mobile device in a community of member mobile devices;
determining a geospatial boundary of the community based at least in part on determining the location of the at least one member mobile device in the community; and
joining the mobile device to the community of member mobile devices based at least in part on the location mobile device satisfying a location dependent criteria associated with the geospatial boundary of the community.

14. The non-transitory computer-readable storage device according to claim 13, wherein the processing device is configured to perform operations further comprising transmitting permission to join the community to the mobile device.

15. The non-transitory computer-readable storage device according to claim 13, wherein the processing device is configured to perform operations further comprising periodically determining that the location of the mobile device is within the geospatial boundary of the community.

16. The non-transitory computer-readable storage device according to claim 13, wherein the processing device is configured to perform operations further comprising separating the mobile device from the community if the location of the mobile device is not substantially within the geospatial boundary of the community.

17. The non-transitory computer-readable storage device according to claim 13, wherein the processing device is configured to perform operations further comprising designating the mobile device as an administrator of the community.

18. The non-transitory computer-readable storage device according to claim 13, wherein the processing device is configured to perform operations further comprising:
determining that the location of the mobile device is not substantially within the geospatial boundary of the community; and
migrating the designation of administrator of the community to at least one other member mobile device in the community.

* * * * *

UNITED STATES PATENT AND TRADEMARK OFFICE
CERTIFICATE OF CORRECTION

| | | |
|---|---|---|
| PATENT NO. | : 8,335,519 B2 | Page 1 of 1 |
| APPLICATION NO. | : 12/629929 | |
| DATED | : December 18, 2012 | |
| INVENTOR(S) | : Peterson et al. | |

It is certified that error appears in the above-identified patent and that said Letters Patent is hereby corrected as shown below:

On the Title Page, in Item (75), under "Inventors", in Column 1, Line 1, delete "W" and insert -- W. --, therefor.

On the Title Page, in Item (75), under "Inventors", in Column 1, Line 2, delete "T" and insert -- T. --, therefor.

On the Title Page, in Item (75), under "Inventors", in Column 1, Line 3, delete "G" and insert -- G. --, therefor.

In the Drawings:

In Fig. 4, Sheet 3 of 9, delete " [image of diamond labeled "Characteristics meet interest criteria?" with "No" arrow] " and insert -- [image of diamond labeled 204 "Characteristics meet interest criteria?" with "No" arrow to "End" circle] --, therefor.

In the Specifications:

In Column 2, Line 28, delete "community" and insert -- community 10 --, therefor.

In the Claims:

In Column 7, Line 1, in Claim 4, delete "geospatial spatial" and insert -- geospatial --, therefor.

Signed and Sealed this
Twenty-third Day of July, 2013

Teresa Stanek Rea
*Acting Director of the United States Patent and Trademark Office*